United States Patent [19]

Patsch et al.

[11] Patent Number: 4,491,662
[45] Date of Patent: Jan. 1, 1985

[54] AMINOMETHYL GROUP CONTAINING CATIONIC DYES

[75] Inventors: Manfred Patsch, Wachenheim; Manfred Ruske, Ludwigshafen, both of Fed. Rep. of Germany

[73] Assignee: BASF Aktiengesellschaft, Ludwigshafen, Fed. Rep. of Germany

[21] Appl. No.: 370,266

[22] Filed: Apr. 20, 1982

[30] Foreign Application Priority Data

May 7, 1981 [DE] Fed. Rep. of Germany ....... 3117956

[51] Int. Cl.$^3$ .................. C07D 498/04; C07D 521/00
[52] U.S. Cl. ...................... 544/74; 260/390; 546/49; 546/101; 546/173; 548/458; 549/227
[58] Field of Search ............ 544/74; 546/49, 101, 546/173; 548/458; 549/227; 260/390

[56] References Cited

U.S. PATENT DOCUMENTS 4,336,377 6/1982 Adam et al. ...................... 544/74
4,400,504 8/1983 Harms et al. .................... 544/75 X

FOREIGN PATENT DOCUMENTS 15233 9/1980 European Pat. Off. .
53743 6/1982 European Pat. Off. .
1444730 11/1968 Fed. Rep. of Germany .
1486752 6/1967 France .
717137 10/1954 United Kingdom .
914249 12/1962 United Kingdom .
1367635 9/1974 United Kingdom .

*Primary Examiner*—Richard L. Raymond
*Attorney, Agent, or Firm*—Oblon, Fisher, Spivak, McClelland & Maier

[57] ABSTRACT

Dyes of the formula

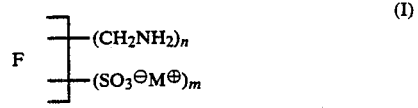
(I)

where F is an (m+n)-valent radical of a quinophthalone, dioxazine, indigo, quinacridone, triphenylmethane or rhodamine dye, M$^{\oplus}$ is H$^{\oplus}$ or one equivalent of a metal cation, m is 0, 1 or 2 and n is 1, 2, 3 or 4, and their salts, are very useful for dyeing and printing paper. If they are used for wet-end dyeing, the waste water is virtually colorless. The colorations obtained exhibit good lightfastness and good bleeding fastness.

4 Claims, No Drawings

AMINOMETHYL GROUP CONTAINING CATIONIC DYES

BACKGROUND OF THE INVENTION

1. Field of the Invention

The present invention relates to novel cationic dyes, their use for dyeing and printing paper, and paper dyed or printed with these dyes.

2. Description of the Prior Art

The prior art has not adequately resolved the problem of recycling printed paper for repeated use. This is primarily due to the lack of dyes having the capability of being easily removed after the life term of the printed material concludes. Thus, there still remains a need for dyes having a high affinity for paper material, and which give a virtually colorless waste water from the dyeing process, have good lightfastness and bleeding fastness, and permit the complete decolorization of a paper which was printed or dyed therewith.

SUMMARY OF THE INVENTION

The novel dyes have the formula I

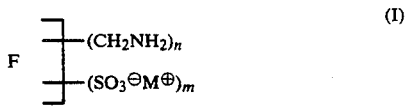

where F is an (m+n)-valent radical of a quinophthalone, dioxazine, indigo, quinacridone, triphenylmethane or rhodamine dye, $M^\oplus$ is $H^\oplus$ or one equivalent of a metal cation, m is 0, 1 or 2 and n is 1, 2, 3 or 4.

Having now generally described the invention, the objects, advantages and features will become apparent to those skilled in the art from the following discussion which is provided herein for purposes of illustration only, and is not intended to be limiting unless otherwise specified.

DETAILED DESCRIPTION OF THE PREFERRED EMBODIMENTS

Preferred dyes of the formula I are those where F is an (m+n)-valent radical derived from benzoquinophthalone, bis-dichlorodioxazine or rhodamine.

Particularly preferred dyes are those of the formulae

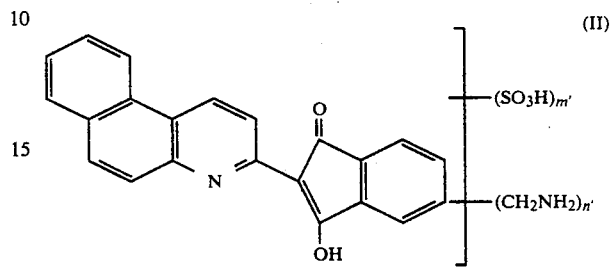

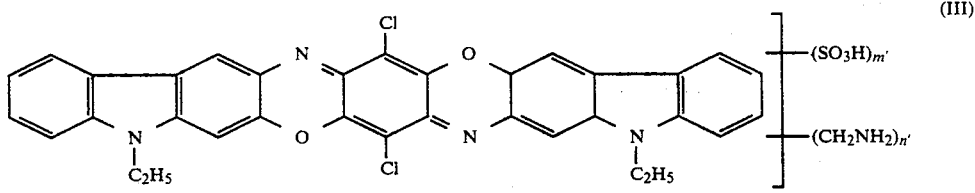

and

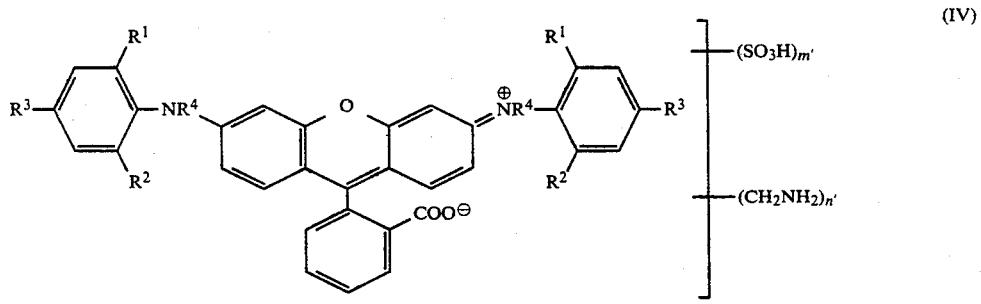

where $R^1$, $R^2$ and $R^3$, independently of one another, are H, $C_1$-$C_4$-alkyl or halogen, eg. chlorine or bromine, $R^4$ is H or $C_1$-$C_4$-alkyl, m' has a mean value of from 0 to 1 and n' has a mean value of from 1 to 3.

Amongst the dyes of the formula IV, those where $R^4$ and $R^3$ are hydrogen are preferred, and, in turn, amongst these the dyes where $R^1$ is H and $R^2$ is —CH$_3$, or $R^1$ and $R^2$ are —CH$_3$, or $R^1$ is —CH$_3$ and $R^2$ is —C$_2$H$_5$, are particularly preferred.

$Me^\oplus$ can, in addition to $H^\oplus$, in particular be an alkali metal ion, eg. Na$^\oplus$, K$^\oplus$ and Li$^\oplus$, and (NH$_4$)$^\oplus$, and can also be a cation of an alkaline earth metal, if the latter gives a water-soluble salt with (I).

A dye I is obtained by reacting a dye F—(H)$_{m+n}$ with an N-methylolcarboxylic acid amide in the presence of a dehydrating agent, followed by hydrolysis of the product.

For economic reasons, suitable N-methylolcarboxylic acid amides are in particular those of the lower aliphatic carboxylic acids.

Preferred N-methylolcarboxylic acid amides are N-methylolformamide and N-methylolacetamide.

Examples of suitable dehydrating agents are concentrated sulfuric acid and 85% strength by weight phosphoric acid. The reaction is preferably carried out in concentrated sulfuric acid, which also serves as the reaction medium.

The reaction is carried out at from 0° to 80° C., preferably at from 5° to 30° C. The hydrolysis is carried out in a dilute mineral acid, preferably in dilute sulfuric acid, at from 60° to 90° C.

This method of preparation of the dyes is toxicologically safe and can, contrary to the alternative method of preparation via chloromethylation, be carried out without special safety measures.

The novel dyes of the formula I and their salts are very useful for dyeing or printing paper. They have high affinity to this material and give a virtually colorless waste water from the dyeing process. Moreover, the novel dyes have good bleeding fastness and, in some cases, also good lightfastness. The paper dyed or printed with the novel dyes can be decolorized virtually completely with bleaching agents, and this is an advantage for reprocessing.

Having now fully described the preferred embodiments, a more complete understanding of the invention can be obtained by reference to the following examples which are provided herein for purposes of illustration only and are not intended to be limiting unless otherwise specified.

The Examples, in which parts and percentages are by weight, illustrate the invention.

EXAMPLE 1

13.1 parts of indigo and 28.1 parts of N-methylolformamide are introduced into 130 parts of 96% strength sulfuric acid at from 0° to 5° C. and the mixture is stirred for 16 hours at the same temperature and then for 48 hours at 23° C. Thereafter it is precipitated by pouring into 1,100 parts of water, and stirred for one hour at 90°-95° C., and the solution is brought to pH 10.0 with 25% strength ammonia. The precipitate is filtered off, washed neutral with water and dried at 80° C.

Yield: 6.7 parts of the dye of the formula

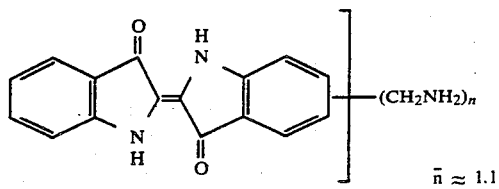

Analysis for n=1 $C_{17}H_{13}N_3O_2$ (262): Calculated: N; 14.4. n=2 $C_{18}H_{14}N_4O_2$ (318): Calculated: N; 17.6. Found: N; 14.6.

The dye is soluble in 30% strength acetic acid nd dyes paper deep blue.

EXAMPLE 2

(a) 29.5 parts of C.I. Pigment Violet 32 (C.I. No. 51,319) are introduced into a solution of 30 parts of N-hydroxymethylformamide in 300 parts of concentrated sulfuric acid at 0°-5° C. The mixture is stirred for 10 hours at room temperature and 6 hours at 35° C., and is then poured onto 2,000 parts of ice. The product is filtered off and dried under reduced pressure at 50° C. Yield: 30 parts of the formylaminomethyl compound of the formula

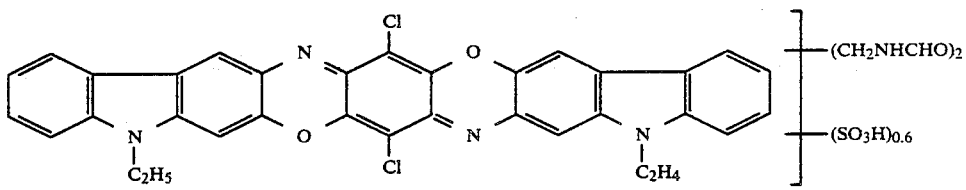

(b) 30 parts of the compound obtained in (a), in 2,000 parts of 20% strength sulfuric acid, are heated for 2 hours at 95°-100° C. The product is then filtered off, washed neutral with dilute aqueous ammonia and dried under reduced pressure at 50° C. Yield: 29 parts of the dye of the formula

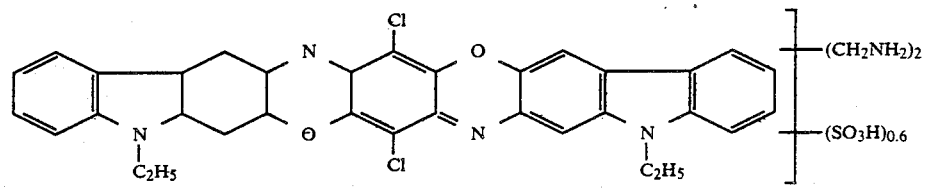

$\lambda_{max}$ in 5% strength acetic acid: 585 nm.

N: Found: 11.9%. S: Found: 2.6%. Calculated: 12.0%. Calculated: 2.7%.

EXAMPLE 3

16.5 parts of 2-[1,3-dioxohydrin-2-yl]-5,6-benzoquinoline are added a little at a time to a solution of 30 parts of N-hydroxymethylformamide in 150 parts of concentrated sulfuric acid at 0°-5° C. The mixture is stirred for 30 hours at 25°-30° C., diluted with 1,500 parts of water, heated further for 3 hours at 90°-95° C., neutralized and cooled to room temperature, and the product is filtered off. Drying under reduced pressure at 60° C. gives 18 parts of the dye of the formula

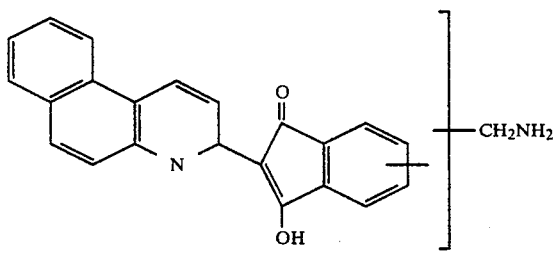

$\lambda_{max}$ (in 3% strength acetic acid): 419 nm.
N: Found: 8.1%. S: Found: 0.1%. Calculated: 7.95%. Calculated: 0.0%.

EXAMPLE 4

37.5 parts of N-hydroxymethylformamide are added dropwise to a solution of 25.5 parts of Solvent Violet 10 (C.I. No. 45,190) in 150 parts of concentrated sulfuric acid at 0°–5° C. The reaction mixture is allowed to come to 20°–25° C. and is stirred at this temperature for a further 15 hours. It is then poured into 1,500 parts of water, and the batch is heated for 3 hours at 90°–95° C. It is neutralized and filtered, and 37 parts of the dye of the formula

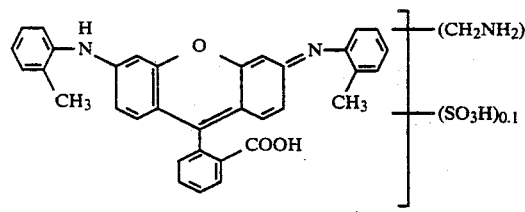

are obtained.

$\lambda_{max}$ (in 3% strength acetic acid): 532 nm.
N: Found: 9.2%. S: Found: 0.6%. Calculated: 9.72%. Calculated: 0.55%.

EXAMPLE 5

The procedure described in Example 4 is used, but in place of Solvent Violet 10 29.3 parts of C.I. Solvent Dye No. 45,195 are used. 30 parts of the dye of the formula

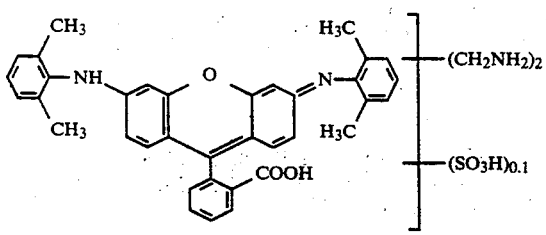

are obtained.

$\lambda_{max}$ (in 3% strength acetic acid): 530 nm.
N: Found: 9.1%. S: Found: 0.5%. Calculated: 9.28%. Calculated: 0.53%.

EXAMPLE 6

The procedure described in Example 4 is followed, but the dye used is the condensate of 2 moles of 2-methyl-6-ethylaniline with 1 mole of 3,6-dichlorofluorane.

Yield: 34 parts of the dye of the formula

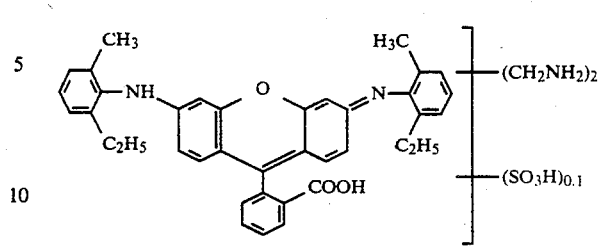

$\lambda_{max}$ (in 3% strength acetic acid): 528 nm.
N: Found: 8.9%. S: Found: 0.4%. Calculated: 8.49%. Calculated: 0.48%.

Having now fully described the invention, it will be apparent to one of ordinary skill in the art that many changes and modifications can be made thereto, without departing from the spirit or scope of the invention as set forth therein.

What is claimed as new and intended to be covered by Letters Patent of the United States is:

1. A dye of the formula

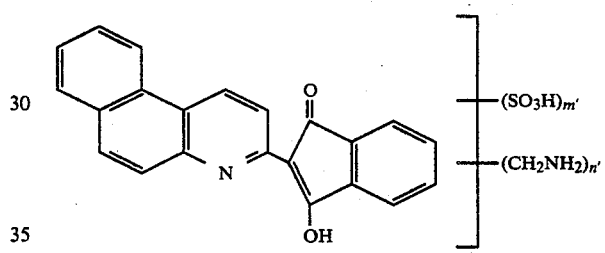

where m' has a mean value of 0.1 and n' has a mean value of 1.1.

2. A dye of the formula

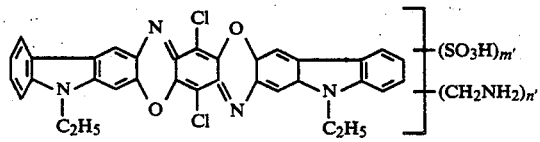

where m' has a mean value of from 0.5 to 1 and n' has a mean value of 1 to 3.

3. A dye of the formula

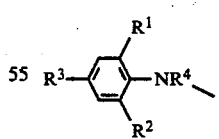

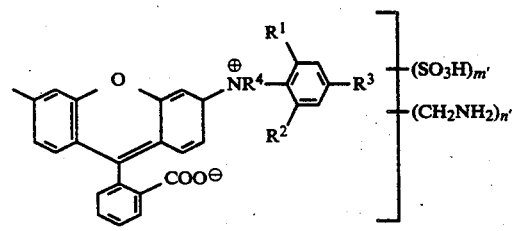

where m' has a mean value of from 0 to 0.5 and n' has a mean value of from 1.5 to 3, $R^1$, $R^2$ and $R^3$, independently of one another, are hydrogen, $C_1$–$C_4$-alkyl or halogen and $R^4$ is hydrogen or $C_1$–$C_4$-alkyl.

4. A dye of the formula:

wherein
M+ is selected from the group consisting of H+, alkali metal ion, NH+4, and alkaline earth metal ion provided that the resulting dye is water-soluble;
m is 0, 1 or 2; and
n is 1, 2, 3 or 4.